(12) United States Patent  
Nelson

(10) Patent No.: US 12,335,250 B2  
(45) Date of Patent: Jun. 17, 2025

(54) TRUSTED PERSONAL NETWORKS MATCHMAKING SYSTEM

(71) Applicant: TrustedNets, LLC, Pittsburgh, PA (US)

(72) Inventor: John P Nelson, Pittsburgh, PA (US)

(73) Assignee: TrustedNets LLC, Pittsburgh, PA (US)

( * ) Notice: Subject to any disclaimer, the term of this patent is extended or adjusted under 35 U.S.C. 154(b) by 162 days.

(21) Appl. No.: 18/369,435

(22) Filed: Sep. 18, 2023

(65) Prior Publication Data

US 2024/0098077 A1 Mar. 21, 2024

Related U.S. Application Data

(60) Provisional application No. 63/408,056, filed on Sep. 19, 2022.

(51) Int. Cl.
*H04L 9/40* (2022.01)
*G06Q 50/00* (2024.01)

(52) U.S. Cl.
CPC .......... *H04L 63/08* (2013.01); *G06Q 50/01* (2013.01)

(58) Field of Classification Search
None
See application file for complete search history.

(56) References Cited

U.S. PATENT DOCUMENTS 7,904,511 B2 * 3/2011 Ryan .................. G06Q 30/0214
709/204
8,060,573 B2 * 11/2011 Leonard ................ G06Q 10/10
709/204
8,251,817 B2 8/2012 Suzuki et al.
8,321,952 B2 * 11/2012 Spalink ............... H04L 63/0421
726/26
8,458,119 B2 * 6/2013 Flinn ..................... H04L 67/306
707/603

(Continued)

*Primary Examiner* — Backhean Tiv
(74) *Attorney, Agent, or Firm* — Bauer & Joseph

(57) ABSTRACT

This is a method for matching users through a peer network. The method comprises creating a trust network with a plurality of trust network members. One of the plurality of trust network members receives a first profile from a first user and a second profile from a second user. The method then associates the first profile with a first trace token and a first consent token and associates the second profile with a second trace token and a second consent token. The method comprises distributing the first profile and the second profile through the trust network, wherein the first profile is anonymized and tracked by the first trace token and the second profile is anonymized and tracked by the second trace token. The method further comprises conducting a review by the plurality of trust network members and assigning a first trust score to the first consent token and a second trust score to the second consent token. Thereafter the first profile is edited with the first trust score and transmitted to the second user and the second profile is edited with the second trust score and transmitted to the first user. The method then comprises determining whether the first consent token is accessible by the first trust score and whether the second consent token is accessible by the second trust score, and establishing access between the first profile and the second profile when the first consent token and the second consent token are activated.

20 Claims, 10 Drawing Sheets

(56) References Cited

U.S. PATENT DOCUMENTS

| | | | | |
|---|---|---|---|---|
| 8,880,447 B2* | 11/2014 | Pearson | G06Q 30/02 | |
| | | | 709/224 | |
| 8,935,296 B2* | 1/2015 | Taylor | H04L 51/04 | |
| | | | 707/804 | |
| 8,990,123 B2* | 3/2015 | Shrivastav | H04L 51/52 | |
| | | | 709/206 | |
| 9,094,396 B2* | 7/2015 | Soni | G06Q 10/00 | |
| 9,503,547 B2* | 11/2016 | Pedraza | G06Q 10/10 | |
| 9,519,937 B2 | 12/2016 | Ryan et al. | | |
| 10,025,835 B2* | 7/2018 | Lerner | G06F 16/248 | |
| 10,320,734 B1* | 6/2019 | Mishra | H04L 51/214 | |
| 11,069,004 B2 | 7/2021 | Ryan et al. | | |
| 11,294,979 B2* | 4/2022 | Makani | H04L 67/535 | |
| 11,409,807 B2* | 8/2022 | Namdev | G06F 16/9035 | |
| 11,425,213 B2* | 8/2022 | Rad | G06Q 50/01 | |
| 11,514,536 B2* | 11/2022 | Sharp | G06F 9/451 | |
| 11,750,555 B2* | 9/2023 | Gaon | G06F 16/9536 | |
| | | | 709/206 | |
| 12,010,078 B2* | 6/2024 | Gopalakrishnan | H04L 51/04 | |
| 2006/0047725 A1* | 3/2006 | Bramson | H04L 67/306 | |
| 2006/0070117 A1* | 3/2006 | Spalink | G06Q 20/383 | |
| | | | 726/3 | |
| 2008/0154895 A1* | 6/2008 | Carmony | G16H 10/60 | |
| 2011/0138302 A1* | 6/2011 | Schleifer | G06F 16/9535 | |
| | | | 709/204 | |
| 2013/0282605 A1* | 10/2013 | Noelting | G06Q 50/01 | |
| | | | 705/321 | |
| 2015/0040245 A1* | 2/2015 | Guha | G06F 21/6218 | |
| | | | 726/28 | |
| 2015/0288644 A1* | 10/2015 | El Daher | H04L 51/52 | |
| | | | 709/206 | |
| 2021/0224341 A1* | 7/2021 | Makani | G06Q 50/10 | |
| 2022/0253555 A1* | 8/2022 | Chopra | G06F 21/6254 | |
| 2023/0011621 A1* | 1/2023 | Jakobsson | H04L 9/3213 | |
| 2023/0055618 A1* | 2/2023 | Jakobsson | G06Q 20/3674 | |
| 2023/0300150 A1* | 9/2023 | O'Neill | H04L 63/102 | |
| | | | 726/22 | |
| 2024/0098077 A1* | 3/2024 | Nelson | H04L 63/08 | |

* cited by examiner

232

262

MESSENGER

Eric
To: John@me.com
Re: Trusted Network Invitation

To a potential trusted network member:

I am interested in forming a "trust network" for the purpose of helping some marriage-age, marriage-ready men and women to find each other, not by spending time studying profiles on the usual dating sites but by having friends help. A person who wants to marry, to form a family, does not want to waste months of texting time with possible dates.

So, I am sending you this message is to ask you to be in my "trusted network". If I know some marriageable man or woman, like I mentioned before, I will ask him or her to write a profile and what they wish to find in a potential spouse. I would then pass that description to you, but without identifying information, with the understanding that you would not tell where you got that referral.

Should you know of some young woman who might be interested, or perhaps your spouse would know someone, or if you formed your own similar network and another such description was circulated, then the young woman would send her description through the same chain of persons (you know where you got the man's description, you or your spouse or friend who referred the woman would know that you had sent it) so the descriptions would come to the man or woman without knowing who suggested it except that it came from a trusted friend.

So, I need you to reply to me that you agree to join my network, at least for this trial period.

Eric

264

 CONFIDENTIALITY INSTRUCTIONS

FIG. 3

TRUSTED PERSONAL NETWORKS MATCHMAKING SYSTEM

CROSS REFERENCE TO RELATED APPLICATION

This application claims the benefit under 35 U.S.C. § 119(e) of U.S. Provisional Application No. 63/408,056 entitled "TRUSTED PERSONAL NETWORKS MATCHMAKING SYSTEM" filed Sep. 19, 2022, which is incorporated herein by reference.

BACKGROUND

Unmarried young adults often have difficulty finding suitable mates for companionship, marriage, and/or starting families. The reasons for not having found a good match are many; often such persons are talented, perhaps with solid careers and good education. The time and effort of career can make putting off finding a mate all too easy, but then at some moment time pressures become evident, but by then many previously eligible people have already married or even divorced, so the pool of possible mates is much diminished compared to college age.

Meeting new people can be difficult, particularly when these young adults have moved to new cities, have demanding jobs, live alone far away from friends or family, and have difficulty joining appropriate social groups. Many have difficulty meeting possible mates by chance encounters or through online matching programs.

Conventional matchmaking services, including computer-implemented services, require much time reviewing profiles, exchanging texts, telephone calls, and/or email communications. Further, such services do not have the practical ability to provide personal testimony in support of potential matches.

In some instances, young adults can be shy, think too negatively about themselves, and/or believe that every person to which they are attracted seems out of reach for them or too good to hope to get to know. As a result, even the most attractive man or woman can scare off persons who may be best suited for them.

In other instances, young people who are succeeding in their career and/or have high incomes can be compromised because the motivation of possible mates can be unclear and hard to discern without a big investment of time and energy.

Other networking possibilities are highly time and place dependent. Members of social groups set up for young working or professional people tend to "age out" as some of the members do get married or date steadily, and as those remaining get older, younger persons do not fit in well. Church and other organizations that might serve a networking purpose also tend to be too homogeneous, so that many busy young people find them boring and/or too competitive to find a suitable mate. As a result, there is a need for an improved matchmaking system.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a method for matching users through a peer network is provided. The method comprises creating a trust network with a plurality of trust network members. One of the plurality of trust network members receives a first profile from a first user and a second profile from a second user. The method then associates the first profile with a first trace token and a first consent token and associates the second profile with a second trace token and a second consent token. The method comprises distributing the first profile and the second profile through the trust network, wherein the first profile is anonymized and tracked by the first trace token and the second profile is anonymized and tracked by the second trace token. The method further comprises conducting a review by the plurality of trust network members and assigning a first trust score to the first consent token and a second trust score to the second consent token. Thereafter the first profile is edited with the first trust score and transmitted to the second user and the second profile is edited with the second trust score and transmitted to the first user. The method then comprises determining whether the first consent token is accessible by the first trust score and whether the second consent token is accessible by the second trust score, and establishing access between the first profile and the second profile when the first consent token and the second consent token are activated.

In various other implementations, a method for providing peer-based review through a trust network is provided. The method comprises creating a trust network with a plurality of trust network members. The method comprises creating a first profile based on a first document from a first user, and associating the first profile with a first trace token and a first consent token. The method also comprises creating a second profile based on a second document from a second user and associating the second profile with a second trace token and a second consent token. The first profile and the second profile are distributed through the trust network, wherein the first profile is anonymized and tracked by the first trace token and the second profile is anonymized and tracked by the second trace token. Thereafter, a review is conducted by the plurality of trust network members and assigning a first trust score to the first consent token and a second trust score to the second consent token. The method further comprises transmitting the first profile edited with the first trust score to the second user and transmitting the second profile edited with the second trust score to the first user and determining whether the first consent token is accessible by the first trust score and whether the second consent token is accessible by the second trust score. Thereafter, an access is established between the first profile and the second profile when the first consent token and the second consent token are activated, and the method comprises enabling editing on the first document and the second document by the first user and the second user.

In various other implementations, a method for providing peer-based review through a trust network is provided. The method comprises creating a trust network with a plurality of trust network members. The method comprises creating a first profile based on a first document from a first user, and associating the first profile with a first trace token and a first consent token. The method also comprises creating a second profile based on a second document from a second user and associating the second profile with a second trace token and a second consent token. The first profile and the second profile are distributed through the trust network, wherein the first profile is anonymized and tracked by the first trace token and the second profile is anonymized and tracked by the second trace token. Thereafter, a review is conducted by the plurality of trust network members and assigning a first trust score to the first consent token and a second trust score to the second consent token. The method further comprises transmitting the first profile edited with the first trust score to the second user and transmitting the second profile edited with the second trust score to the first user and determining whether the first consent token is accessible by the first trust score and whether the second consent token is accessible by the second trust score. Thereafter, an access is established between the first profile and the second profile when the first consent token and the second consent token are activated, and the method comprises enabling editing on the first document and the second document by the first user and the second user.

These and other features and advantages will be apparent from a reading of the following detailed description and a review of the appended drawings. It is to be understood that the foregoing summary, the following detailed description, and the appended drawings are explanatory only and are not restrictive of various aspects as claimed.

BRIEF DESCRIPTION OF THE DRAWINGS

FIGS. 3-17 illustrate exemplary graphical user interfaces in accordance with this disclosure.

DETAILED DESCRIPTION

Figure 1:
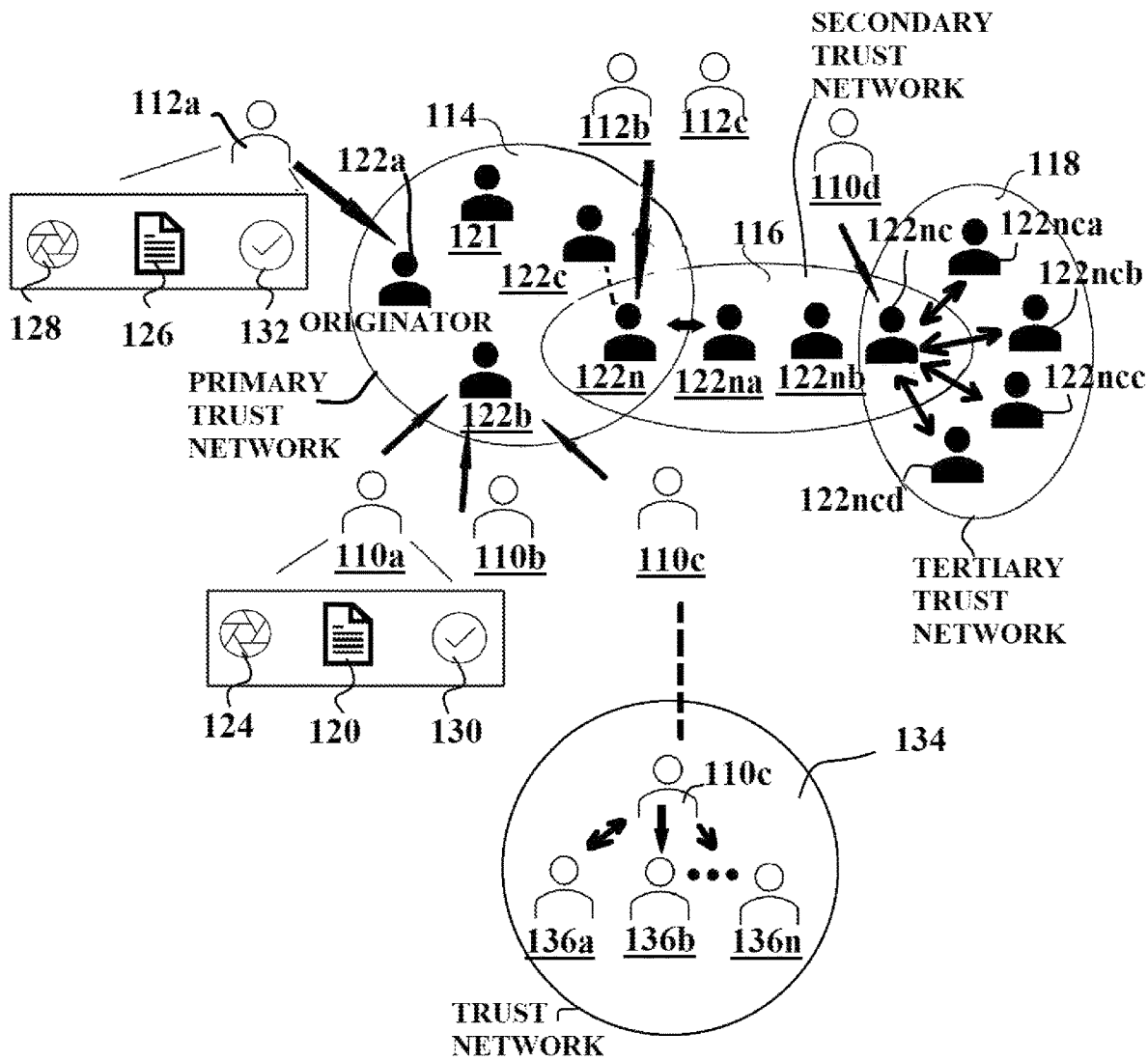
FIG. 1 is a schematic diagram of a matchmaking system in accordance with this disclosure.

The subject disclosure is directed to a trusted network matchmaking system and, more particularly, to computer-implemented systems and methods for matching an eligible user with a potentially matching user through one or more trust networks.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

In the implementation of the system, an eligible user profile is given, either by hand or digital means, to their friend who is in such a trust network. Then the profile is shared with the other members of that network, or several connected tiers of networks, asking the members to consider finding a potentially matching user.

An anonymized potentially matching user profile is received over an electronic network from the potentially matching user through the primary trust network, which has discretion to submit back to the first eligible user for their consideration. A consent token is exchanged over the electronic network when the eligible user and the potentially matching user agree to make a first contact, probably in a still-anonymous way until they decide to reveal their identities and then how to proceed to get further acquainted. The system maintains anonymity for all the potentially matched parties until those parties agree to reveal themselves after exchanging anonymous communications.

The system provides ways for members of the trust networks to set up introductions between eligible users and potentially matching users, without engaging in a direct match making roles. Each of the trust network member can provide input on which eligible member and eligible matching user should be matched together. This provides a peer-based match making system that is distinguishable from the traditional dating/matchmaking apps.

Direct match making can easily breach confidential relationship boundaries, or embarrass either the parties or the matchmaker, if the introduction does not work out smoothly, or results in rejection by either party and/or results in disruptions of otherwise healthy personal or family relationships. By utilizing a peer-based match making system, matching making are conducted by members of the trusted network with a further degree of consideration. The added anonymity for the profiles during review period provides much needed objectivity for both the eligible user and the potential matching user.

The system utilizes two different types of tokens. One type of token is a trace token that allows the system to track the exchange of profiles throughout the networks. The other type of token is a consent token, which allows the parties to facilitate contact with one another upon peer generated matchmaking.

The system can obtain and track various metrics, such as quality scores and trust scores. The quality scores can be associated with participant profiles, which reflect the accuracy of the profile, not necessarily whether the parties actually went further in their relationship. The quality score does not necessarily represent a judgment about the qualities of the other party, but only of the profile presented by that party. The quality score provides a peer-based review system for the anonymized profiles within the platform, such that a heightened degree of reliability can be expected by the eligible user and the potentially matching user. Essentially the quality scores serve as a testimony as the trustworthiness of the profile. This metric is independent of the actual information of the profile and how an eligible user may feel about the potential matching user profile; instead, the quality score allows an eligible user to evaluate the reliability of the information presented. This differs from traditional matchmaking metrics that focus primarily on creating compatibility analysis based on information provided by each user. The quality scores eliminate the risk of generating matches based on falsely provided information and relies on a trusted peer group to verify the information presented. Such quality score system serves as an additional tool to evaluate a potentially matching user. The quality scores and the trust scores are stored by the system on a confidential basis to improve the system.

Figure 1B:
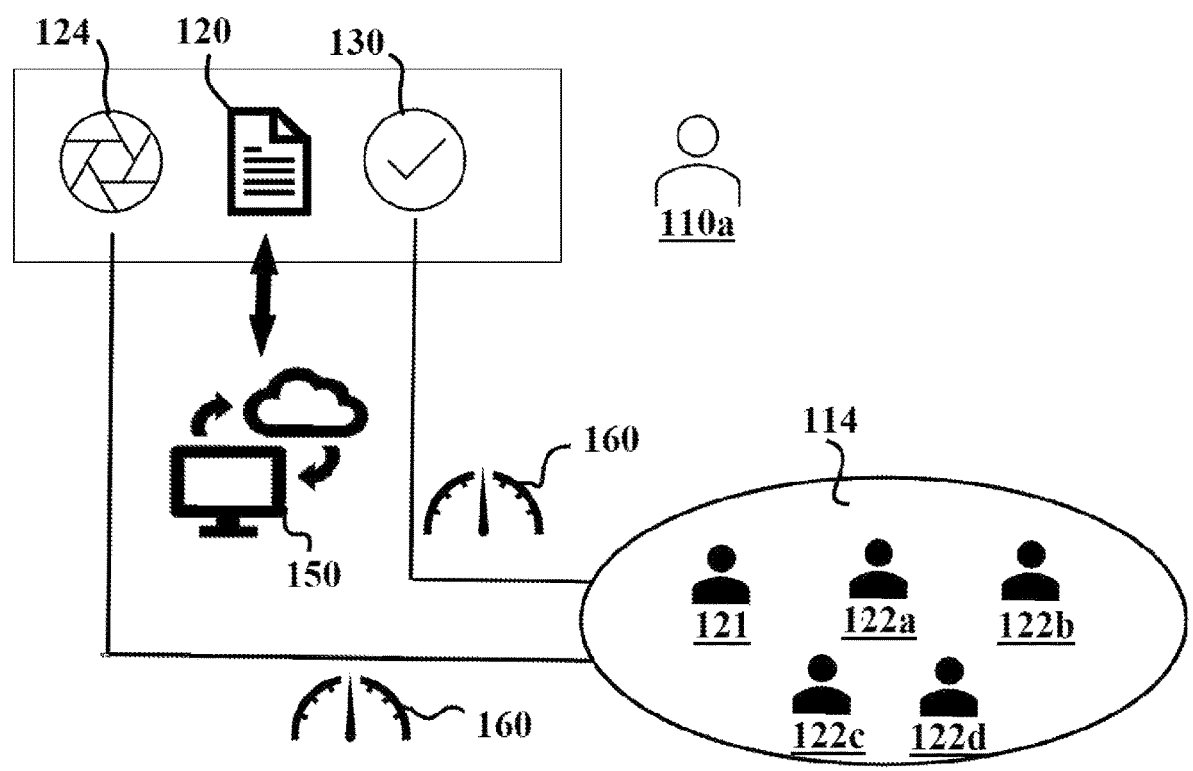
FIG. 1B is another schematic diagram of a matchmaking system in accordance with this disclosure.
Figure 2:
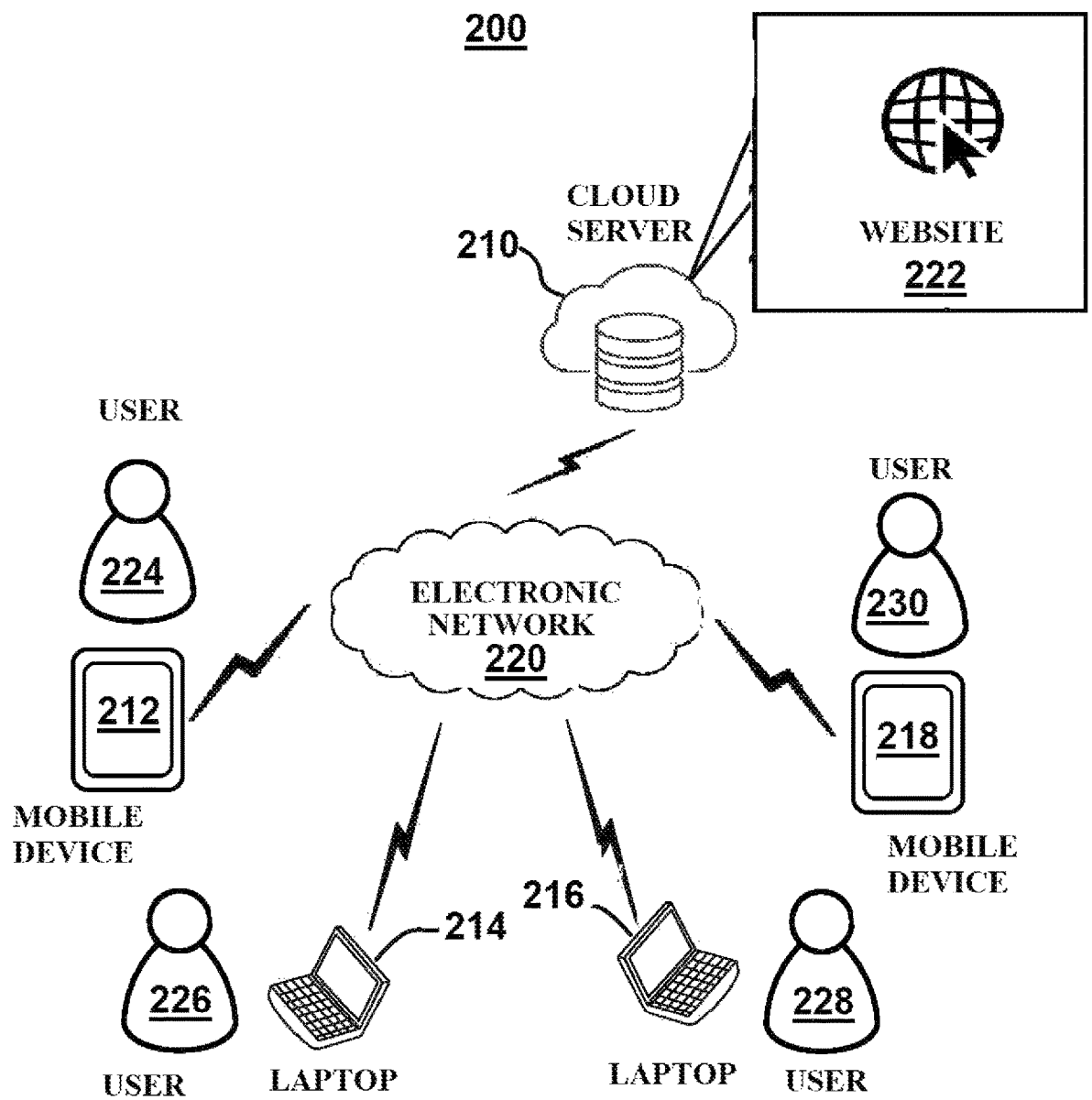
FIG. 2 is a schematic diagram of the matchmaking system shown in FIG. 1 implemented through an electronic network.
Figure 4:
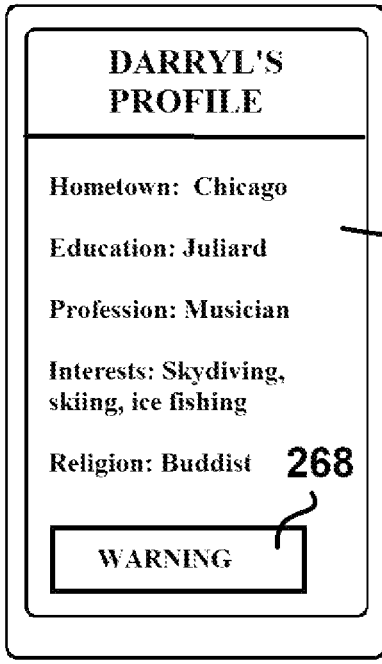
Figure 5:
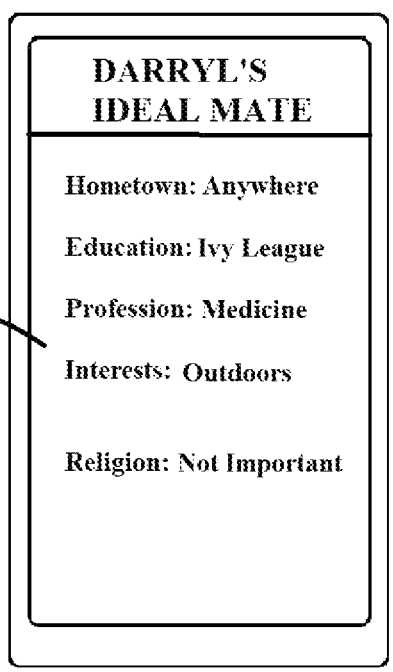
Figure 6:
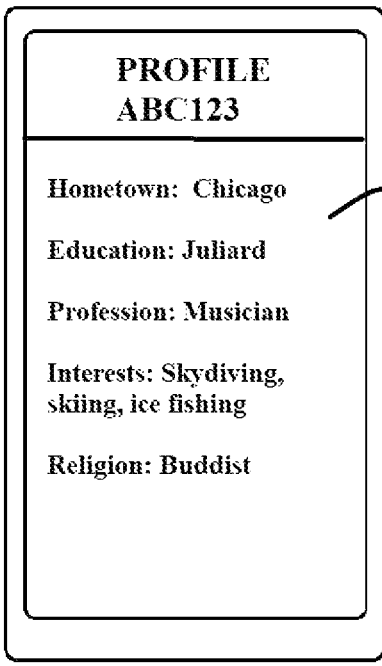
Figure 7:
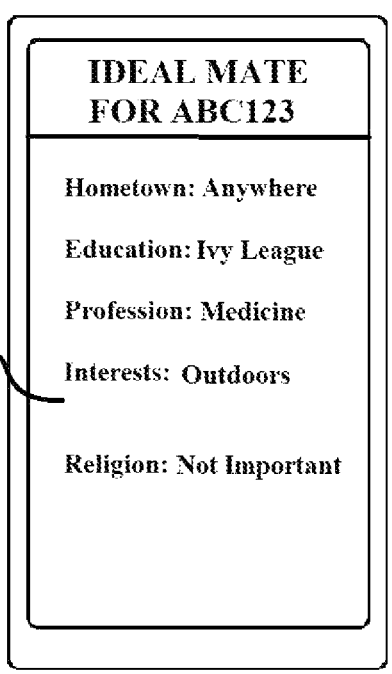
Figure 8:
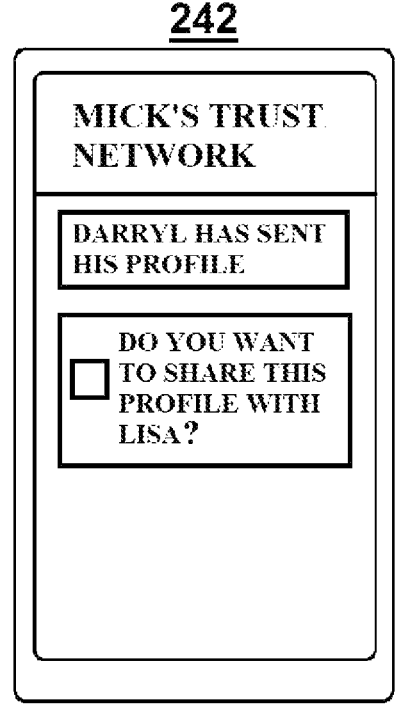
Figure 9:
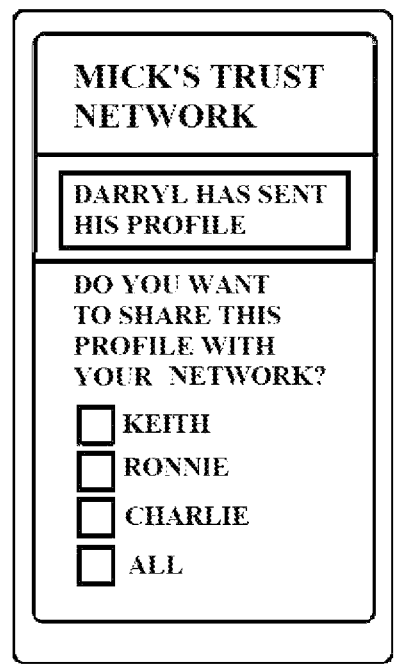
Figure 10:
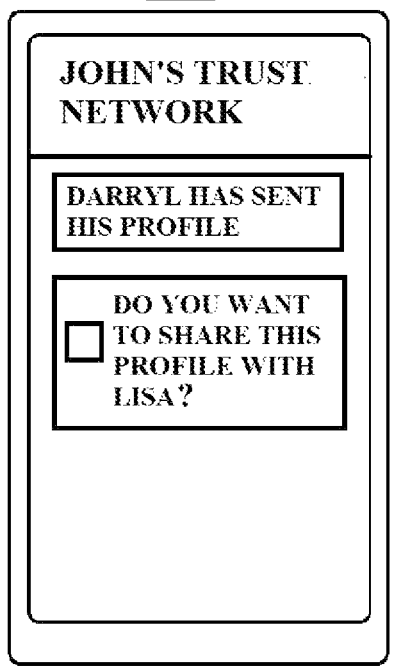
Figure 11:
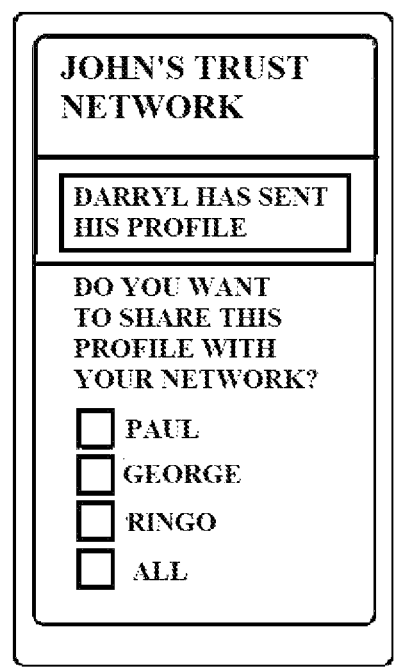

Referring to FIG. 1a-1b, a matchmaking system, generally designated by the numeral 100, is shown. The matchmaking system 100 is particularly adapted for matching eligible users 110a-110c with potentially matching users 112a-112c through one or more trust networks 114-118 for forming interpersonal relationships. In the exemplary embodiment, the matchmaking system 100 is used for dating purposes. In various other embodiments, the matchmaking system 100 can be used for workplace partnership, entrepreneurial collaboration, and/or employment purposes. It is envisioned that the matchmaking system 100 provides a peer-based recommendation and review platform to facilitate verified user interactions for a variety of purposes.

In the exemplary embodiment, the originator 121 of the trust network can identify potential primary trust network members, such as primary trust network member 122a-n, by identifying persons in their social circles that are deemed trustworthy. Such person can include friends, relatives, teachers, clerics, or other people whom they trust to provide reliable references and referrals. The originator 121 will then send a "Join My Trust Network" document to each of them, a document that will define the purpose of this trust network and the conditions for joining. If they agree to take part in the network, they become a primary trust network member 122a-n and will comprise the primary trust network 114. The originator 121 will participate in the primary trust network 114 in function that is consistent with other primary trust network members. Each of the primary trust network member 122a-n can in turn organize and create a secondary trust network 116 with secondary trust network members 122na-nc. In the same fashion, a secondary trust network member 122nc can organize and create a tertiary trust network 118 with tertiary trust network members 122nca-ncd. Further tiers of trust networks could be added, always with the same purpose and conditions as specified by an originator 121 of the primary trust network.

The primary trust network member 122a-n can collaborate to assist matching for a person of their choosing, which can be an eligible user 110a. In short, the system 100 provides a peer-based platform to connect eligible users 110a-c with potentially matching users 112a-c. The eligible user 110a can participate in the system 100 by creating a profile 120 with a trace token 124 and a consent token 130 associated thereon. The creation and association of the profile 120 will be discussed in more detail thereafter.

In an exemplary embodiment, the eligible users 110a can initiate the matchmaking process by sending his or her profile 120 to the primary trust network member 122b. The primary trust network member 122b can send the profile 120 to one or more of the potentially matching users 112a-112c either directly or indirectly through the trust networks 114-118 via one or more of the network members. For example, the eligible user 110a submits a profile 120 to the primary trust network member 122b, who can be a person connected to a social network in real life. The primary trust network member 122b in turn sends the profile 120 for evaluation within the primary trust network 114, where primary trust network members 122a-n will review and provide necessary score and feedback for the profile 120. One primary trust network member 122n can submit the profile 120 to members of the secondary trust network 116. The secondary trust network 116 can conduct the same review on the profile 120, which can then be submitted to a tertiary trust network 118 via a tertiary trust network member 122nc. Each of the trust network are connected to others through one or more dual members. It is envisioned that access to the profile 120 across trust networks can be done with permission and through connecting members only, such that a moderated level of privacy and anonymity is maintained across the trust networks 114-118.

It should be understood that the originator 121 can participate in the trust networks 114-118 in the same manner and perform the same functions as the network members 122a-122n.

The profile 120 is an anonymized user profile for the eligible user 110a. The profile 120 can also include a description of a preferred mate for the eligible user 110a. The profile 120 will contain an encoded identifier for the eligible user 110a that can function as a trace token 124. The trace token 124 proceeds through the trust networks 114-118 with the profile 120, so that the profile 120 can be traced by the system 100 for return messaging.

The trace token 124 is coupled to the profile 120 to track the progress of the profile 120 through the system 100. The trace token 124 does not contain any personal identifying information relating to the eligible user 110a. Thus, reviewing of the profile 120 does not equate to the identification of the eligible user 110a, such that trust network members can evaluate the information on the profile 120 without bias.

Referring to FIG. 1B, the operation between trust and eligible users is further designated as 100b. The eligible user 110a provides a profile 120 for the primary trust network 114 to evaluate, share, and matchmaker. The profile 120 can be generated natively on the platform 100 based on information provided by the eligible user 110a. In an exemplary embodiment, the system 100 provides a form for the eligible user 110a to enter the information for a profile 120 to be generated. In various other embodiments, the profile 120 can be imported or incorporated from user profiles in associated networks or websites. For instance, the system 100 can integrate with external dating websites in order to extract information. The external profiles can be fully integrated into the profile 120. Alternatively, the system 100 extracts only essential information for matchmaking purposes without compromising anonymity of the eligible user 110b.

The profile is associated with the tracing token 124 and the consent token 130. During evaluation and sharing of the profile 120, the primary trust network 114 allows members to provide scores based on their evaluation. The primary trust network members 121-122d can provide a trust score 160 to be attached to the tracing token 124 and the consent token 124. Depending on the setting of each trust network, the trust score 160 would dictate the level of access for matchmaking with the profile 120. In one scenario, the trust network members 121-122d have deemed the profile to contain a score 160 that is below standard, wherein the profile access token 124 would prevent the profile 120 from being shared with certain other trust networks with a higher than standard requirement. Similarly, the consent token 130 would rely on the trust score 130 to determine access level to other potentially matching users 112a-d.

In the exemplary embodiment where the profile 120 is imported from or integrated with external profiles, the consent token 130 would provide communication access through the external websites, if both parties agree. It is envisioned that the trust score 160 would deny access to external websites' communication channel if below certain standards. Essentially the trust network 114 becomes an additional safeguard for a plurality of matchmaking services, wherein the trust network 114 serves as a democratized peer to peer review process for external services.

One of the potentially matching users, potentially matching user 112a, can receive the profile 120 for review from a primary trust network member 122a. The potentially matching user 112a can have their own associated profile 126, trace token 128, and consent token 132. If the potentially matching user 112a is interested in starting a conversation with the eligible user 110a, the potentially matching user 112a can send his or her profile 126 to their corresponding primary trust network member 122a, who can in turn submit the profile 126 through one or more of the networks 114-118 via the members 122a-122ncd.

The profile 126 is an anonymized user profile for the potentially matching user 112a. The profile 126 will contain an encoded identifier (i.e., trace token 128) for the potentially matching user 112a that functions in a similar manner as trace token 124.

Similarly, the trace token 128 allows the profile 126 to be transmitted through the networks 114-118 with a level of privacy and anonymity, as it is separate from the content of the profile 126. Through the review process, each of the networks 114-118 can decide if the profile 126 is a good match for the profile 120, based on their own shared standard of review. The system 100 thus provide a democratized review and rating process for conducting matchmaking between various profiles. The profiles 120 and 126 are scrutinized by the trust network members through each trust network as well as in aggregate. As such, the eligible user 110a and the potentially matching user 112a can rely on anonymous objectivity before the respective profile is presented to each user.

Once the eligible user 110a and the potentially matching user 112a have exchanged anonymous profiles (i.e., profile 120 and 126), the eligible user 110a and the potentially matching user 112a can indicate an interest to start a digital conversation. In the exemplary embodiment, the digitation conversation can be imitated by exchanging consent tokens 130-132 through the system 100. In some embodiments, the consent tokens 130-132 can be purpose-driven email communications or similar messages with hyperlinks embedded therein.

After mutual consent, the system 100 will invite the eligible user 110a and the potentially matching user 112a to start a digital conversation. During this conversation, the system 100 will maintain the anonymity of the eligible user 110a and the potentially matching user 112a. The system 100 will maintain the anonymity until the eligible user 110a and the potentially matching user 112a mutually agree to become acquainted.

The consent tokens 130-132 can include hyperlinks or other similar click-activated devices to direct the eligible user 110a and/or the potentially matching user 112a to an anonymous conversation. In the exemplary embodiment, the system 100 is implemented as a standalone platform wherein the profile 120 and 126 are generated thereon, where consent tokens 130-132 can include direct communication channels that are native to the system 100. Alternatively, the system 100 can be implemented in conjunction with other existing platforms. In that exemplary embodiment, the profiles 120-126 are imported from external platforms and anonymized through the system 100. The consent tokens 130-132 can be linked to a profile on a website or to some other information that would reveal the identity of the eligible user 110a and/or the potentially matching user 112a, once the eligible user 110a and/or the potentially matching user 112a agree to contact and/or to reveal their identities to one another. The system 100 can thus be used to incorporate a peer-based match making with external accounts, and is not limited as a standalone match making website or app. Integration of external profiles into the profiles 120-126 allow the trust networks 114-118 to provide additional review and check for existing matchmaking websites, apps, or programs.

In this exemplary embodiment, the system 100 is configured to allow the eligible user 110a to initiate a conversation by sending the consent token 130 through the networks 114-118 and to allow the potentially matching user 112a to initiate a meeting by sending the consent token 132 through the networks 114-118. However, it is contemplated that alternative embodiments can limit the ability of either the eligible user 110a and/or the potentially matching user 112a to send the consent tokens 130-132 and/or to restrict access by the eligible user 110a and/or the potentially matching user 112a to send consent tokens through one or more of the networks 114-118.

It is further contemplated that the system 100 can be integrated with already-existing matching service, such as Match.com, eHarmony, JDate, Catholic Match, Christian Mingle, or other religious-specific dating websites, non-religious specific dating websites, or cultural specific dating websites. In other embodiments, the system 100 can integrated with other social networks, such as Facebook or LinkedIn.

In yet other embodiments, consent tokens 130-132 can direct the eligible user 110a and/or the potentially matching user 112a to a proprietary website (not shown) that competes with existing dating web sites and/or social media websites. The proprietary website can provide extra flexibility in passing profiles 120 and 126. However, the system 100 can be configured to allow the eligible user 110a and/or the potentially matching user 112a to specify which sites would be acceptable to them because users can be reluctant to create multiple profiles.

When both the eligible user 110a and the potentially matching user 112a are members of the same external dating website or social media website, the system 100 can configure the consent tokens 130-132 to include a link to provide the ability for the eligible user 110a to view website profile of the potentially matching user 112a and vice versa. In such embodiments, the system 100 can bolster the trust between eligible user 110a and the potentially matching user 112a when using external dating websites and/or social media websites for matchmaking purposes.

The system 100 can provide benefits to external dating websites and/or social media web sites by encouraging the eligible user 110a and the potentially matching user 112a to subscribe to such websites, Further, the system 100 can encourage the eligible user 110a and/or the potentially matching user 112a to join such websites to make themselves visible thereon when that is appropriate.

In an exemplary embodiment, the trusted networks 114-118 and trusted network members 122a-122ncd can provide scoring on the profiles 120-126, which will determine the access that the consent tokens 130-132 can provide. The originator 121 and trusted network member 122b, for instance, can score the profile 120 based on the comparison of the information provided therein with info collected from the eligible user 110a during external conversations. Due to the nature of the primary trusted network 114 being a representation of a real-life community that the eligible user 110a may belong to, the primary trust network 114 can provide proof of truth within the profile 120. Consequently, the profile 120 and the associated consent token 130 will have a trust score attached, which can determine the access it provides with other potentially matching users 112a-c. It is envisioned that a trust score requirement or limit would be played on the consent token 130, such that the system 100 does not maintain access between the consent token 130 with the consent token 132 if the trust score is below requirement.

The primary trust network members 122a-n, once they agree to join the primary trust network 114, can begin identifying suitable people, such as the potentially matching user 112a, for matching with the eligible user 110a. If they judge that someone, such as 112a-n, would be suitable for the purpose of the network 114, then they can approach that person to introduce them to the possibility of using the network for their benefit.

Sample letters could be made available, through the system 100, to the network member 122a to facilitate that introduction. The sample letters can express a desire to help the eligible user 110a to match to suitable persons such as 112a. Such invitations must introduce the idea of a trust network and indicate what would be expected of the primary trust network member 122a, as a trusted person, and how they could help 110a to write a profile with just the right amount of information, ensuring that the details are correct and the tone is appropriate, but avoiding identifying information. Both 110a and 122a will be expected to be candid since the accuracy of the resulting profile will be another point of trust in the network, and their future credibility will be dependent on the quality of their effort.

In some embodiments, the profile 120 can be a written sketch that can be prepared by the eligible user 110a alone. In such embodiments, the primary trust network contact 122b will still need to affirm its accuracy based on their personal knowledge of the person. In other embodiments, the primary trust network member 122b can prepare the profile 120 without assistance of 110a, but always with their approval and consent.

The profile 120 can be created by the eligible user 110a or on behalf of the eligible user 110a by an associated trust network member 122b. The profile 120 will have an associated trace token 124 and a consent token 130. The trace token 124 is associated with the eligible user 110a but is not used to identify the eligible user 110a without consent. The profile thus provide sufficient information for any potential matching users 112a-c and trust network members 122a-122ncd to review without compromising the anonymity of the eligible user 110a. This is differentiated from the traditional matchmaking apps or programs, where personal profiles are immediately identifiable by the person. The layered access structure also allows trust network members 122a-122ncd to moderate the contents of the profile 120 with minimum bias, as it is separated from the identity of the eligible user 110a. Upon creation and during the peer review process, the eligible user 110a can access and edit the profile 120 through the access token 124.

After the profile 120 is accepted by both the eligible user 110a and the primary trust network member 122b, the primary trust network member 122b can enter the eligible user 110a into the primary trust network 114. The trace token 124 can be coupled to the profile 120 when the eligible user 110a is entered into the primary trust network 114 or at any time before the profile 120 is distributed through the primary trust network 114. Similarly, the eligible user 110a can be provided with the ability to issue consent tokens 130 at that time or at any other appropriate time.

As shown in FIG. 1, any primary trust network member such as 122n can generate a secondary trust network, such as secondary trust network 116, to broaden the scope of possible matches for 110a-n. Secondary trust networks, such as secondary trust network 116, can include secondary trust network members 122na-122nc. The secondary trust network 116 can be formed in the same way as the primary one 114, using the same purpose and conditions as set by the originator 121. In some embodiments, the primary trust network member 122n can perform the same functions as the originator 121 did in forming the primary trust network 114 and, optionally, can use the same invitations as the originator 121.

The system 100 can facilitate that process by generating a screen (not shown) that allows the primary trust network members 122a-122n to add their own trusted friends (e.g., trust network members 122na-122nc) and to send the same documents (not shown) that can be accompanied by a personal statement from one or more the trust network members 122a-122n.

The secondary trust network members 122na-nc can distribute the profile 120 through the secondary trust network 116 in the same manner as the profile 120 was distributed through the primary trust network 114. The secondary trust network members 122na-122nc can have the ability to share the profile 120 with tertiary trust network members 122nca-122ncd within the tertiary trust networks 118 in an effort to further widen the search for a potentially matching user, such as potentially matching user 112a. It should be understood that the profile 120 can be shared with additional tiers of trust networks (not shown), should any of the trust network members 122a-122ncd choose to create and share with additional trust networks.

The system 100 can be configured to send messages to the primary trust network members 122a-122n, the secondary trust network members 122na-122nc, and the tertiary trust network members 122nca-122ncd (or to higher tiers if they exist (not shown) reminding the members 122a-122ncd of the need to use discretion and judgment about whose suggestions they might trust. The messages can remind the network members 122a-122ncd and higher tiers that the profile 120 should not be shared or subject to broadcast outside of the trust networks 114-118 because the trust networks 114-118 are limited by the originator 121 to trusted persons who have been endorsed, either directly or indirectly, by the eligible user 110a and by his or her contact member 122a and all the others (members 122b-122ncd) in the chain of trust. In various embodiments, the access token 124-128 can be coupled with limitations that would prevent unauthorized sharing. The originator 121 and/or the primary trust network 114 can place a limiting factor on the access token 124-128, such that the profiles 120-126 cannot be shared beyond a certain tier of trust networks. The system 100 would deny access token 124-128 beyond an agreed upon level of sharing access, such that any of the trust network members 122a-122ncd will need to request further permission.

The number of network tiers to be employed can be restricted by eligible person 110a before he or she is entered into the primary network 114 and adjusted by the eligible person 110a as desired at any time. In the exemplary embodiment, the eligible user 110a can place access limitation on the access token 124 such that it can only be used to grant access within the primary trust network 114. If the trust network member 112n wants to share the profile 120 with their secondary trust network 116, they need to discuss with members of the primary trust network 114 as well as the eligible person 110a.

In other embodiments, the primary trust network members 122a-122n may not know each other and may not be able to discuss anything within the primary trust network 114. In such embodiments, the eligible person 110a will have the ability to determine how many tiers will be shown within the networks. This allows a flexible degree of privacy for the end users.

If one or more of the primary trust network members 122a-n, the secondary trust network members 122na-122nc and/or tertiary network members 122nca-122ncd identifies a potentially matching person, such as the potentially matching user 112a, the system will remind the member 122a-122ncd to approach potentially matching user 112a in the same manner as the eligible user 110a was approached, using the same or similar invitations guides, which can also be available as templates in the system for their guidance or modification (always keeping the purpose and conditions of the system 100 intact).

If potentially matching user 112a decides that he or she would like to start a conversation with the eligible user 110a, the potentially matching user 112a can send his or her own profile 126 back through the system 100. Similar to the manner in which the system 100 handles access with the profile 120, the system also respects the limitation placed upon the tracing token 128 in regard to distributing the profile 126. The system 100 can thus distribute the profile 126 within the trust networks 114-118 without direct intervention from the potential matching member 112a. When the potentially matching user 112a sends the profile 126, the system 100 can require implicit consent to communicate through a confidential chat or other technology which would keep the identity (and email and phone numbers) of the eligible user 110a and the potentially matching user 112a anonymous.

Should the eligible user 110a review the profile 126 and decide that the potentially matching user 112a would be suitable for such a conversation, the eligible user 110a can indicate through the consent token 132 to return a consent-to-communicate message back through the system 100 to the potentially matching user 112a. In some embodiments, the message can be in the form of a flag on the profile 126 indicating that the eligible user 110a is open for communication. In other embodiments, the message can be a personal note.

Once a consent-to-communicate message is sent, a communication channel can be activated to be used by the eligible user 110a and the potentially matching user 112a to get to know each other better. The system establishes a connection between the profiles 120-126 through configuring the consent tokens 130-132 for additional communication. As indicated previously, such communication can take place on a native platform on which the system 100 is implemented. In other embodiments, the consent tokens 130-132 are implemented in conjunction with external platforms, such that the matching enables communication through channels existing on the external platforms. It is envisioned that the consent tokens 130-132 are implemented with a heighted level of integration with external platforms, such that information exchanged through the external platforms can be traced with the access tokens 124-128. In turn the profiles 120-126 can continuously be evaluated in order to maintain the trust scores, which would affect the access tokens 124-128 during the communication stage.

As shown in FIG. 1, another eligible user 110c who is utilizing primary trust network 114 can set up another trust network 134 that includes members 136a-136n that can have a similar purpose or an entirely different purpose that is specific to the needs of the eligible user 110c. Through this network 134, the eligible user 110c can then invite family or friends to use the same system to find potential matches. While the user network 134 is not initially overlapping with the trust network 114-118, the originator 121 maintains ability to assess the eligible user 110c in order to approve integration. Upon approval, the use 110c can be inducted as a trust network member for the primary trust network 114. Alternatively, the trust network 134 would treat the primary trust network member 122b as an eligible user, in the same manner but reversed with the eligible user 110c and the primary trust network 114. It is envisioned that the system 100 enables fluid exchange of trust network, trust network members, and eligible users in order to support dynamic network interactions.

In some embodiments, the trust networks of the eligible users 110a-110d and/or potentially matching users 112a-112c can overlap with one or more of the trust networks 114-118, such that the system 100 will need to verify that the profiles, such as profile 120 and/or profile 126, match the identity of the corresponding user, such as eligible user 110a and/or potentially matching user 112a, to avoid redundancy and/or to maintain security. Further, the eligible users 110a-110d and/or the potentially matching users 112a-112b can be a passive reviewers of profiles, such as profile 120 and/or profile 126, until a decision is made to request contact between them.

Referring to FIG. 1, the system 100 can be configured to obtain scores and/or metrics from the users 110a-110d, users 112a-112c, members 122a-122ncd, and/or members 136a-136n, once a match has been made and/or rejected. The score can be scores 160 as illustrated in FIG. 1B. The score 160 can be based on the trustworthiness of the profile (e.g., profile 120 and/or profile 126), on whether the other person is ideal for them, on whether they continue to develop a relationship, or any other suitable metric. In this exemplary embodiment, the system 100 tracks trust scores based upon on the trustworthiness of the profile (e.g., profile 120 and/or profile 126).

The trust scores 160 can be tracked by the system 100, so that as experience is gathered, the users 110a-110d, users 112a-112c, members 122a-122ncd, and/or members 136a-136n can build up an index of the quality of the profiles (e.g., profile 120 and/or profile 126) and, in some embodiments, how many responses each of those has generated. The trust scores can be associated with the access tokens 124-128 and/or the consent tokens 130-132, such that the trust score would determine the ability for the users 110a-110d, potential matching users 112a-112c, and members 122a-122ncd to share the profiles. In various embodiments, the trust scores are parameters associated with the consent tokens 130-132 in order to determine if communication should be granted.

The networks, such as networks 114-118 and/or network 134, can be scored in a similar way, so that if such a network generates few responses, or the profiles that it generates are not scored highly by the other parties (not accurate or trustworthy in some way), the trust scores of profiles passing through it might be reduced in their score, perhaps even being excluded from the network if those are poorly scored consistently. It should be understood that the system 100 allows trust network members 122a-122ncd to essentially determine access level and communication privilege between the eligible users and potentially matching users, in a peer reviewed manner. The scoring metrics are compiled and analyzed within the system 100.

It should be understood that the system 100 can be configured for other purposes, such as to match potential employers with employees and/or to help homeowners identify contractors to perform tasks. For example, the system 100 could be used to provide a trust network to recruit employees (providing an alternative to sites such as LinkedIn, Indeed, Monster, Ziprecruiter, and others), or to find people who would appreciate knowing about affiliated groups from trusted friends.

It should be understood that the scope of trust networks is not limited to trust networks 114-118 and network 134. Other users, including users 110a-110d, users 112a-112c, members 122a-122ncd, and/or members 136a-136n, or any other potential users/member can set up his or her own trust networks. In such embodiments, the originator (not shown) of the new trust network can define the governing purposes, conditions, and content of invitation documents for such networks.

It should be understood that in addition to profiles, file sharing and editing through the platform 100 can be achieved with the process described herein. In an exemplary embodiment, the profiles 120-126 can be documents to be reviewed by collaborators, either on the platform of the system 100 or an external platform. The access tokens 124-128 allow the documents to be shared with the trust network members 121-122ncd with anonymity. Similarly, the consent tokens 124 allow documents to be shared or published on external websites upon completion of review. The trust score 160 can further serve as a peer-based review, such that the documents with high trust score 160 can be shared and utilized by more numerous and stringent trust networks. It can be understood that the system 100 can be implemented as a peer-based review system for document sharing purposes.

In some embodiments, the eligible users 110a-110d can have the ability to control the geographic areas in which potentially matching users 112a-112c are located. The networks 114-118 and 134 can have specified geographic centers or have nodes that are displayed on map to facilitate the identification of the locations of potentially matching users 112a-112c. The display of the geographic information can be based upon zip codes, regions, or other indicia of non-specific locations to maintain anonymity.

Additionally, the eligible users 110a-110d can limit the geographic scope of their networks by specifying a maximum distance in which a potentially matching user can be located. In such embodiments, the eligible users 110a-110d can consider other factors, such as places where they travel frequently (for work or for other reasons), which they consider attractive for cultural or recreational reasons, and/or where they would like to relocate.

The various implementations described above contribute to a peer-based trust network that can be used in conjunction with a variety of existing matchmaking programs in order to provide additional safeguard for users.

Referring to FIGS. 2-18 with continuing reference to the foregoing figures, an exemplary operating environment, generally designated by the numeral 200, is shown. The operating environment 200 includes a cloud server 210 that connects to a plurality of computing devices 212-218 over an electronic network 220. The cloud server 210 hosts a website 222. The operating environment 200 can be utilized to implement the system 100 shown in FIG. 1.

The computing devices 212-218 can be operated by users 224-230 to access the system 100 shown in FIG. 1. In this exemplary embodiment, the users 224-230 can be users 110a-110d, users 112a-112c, members 122a-122ncd, and/or members 136a-136n shown in FIG. 1. The cloud server 210 can implement the trust networks 114-118 and/or 134 shown in FIG. 1 for access by the users 224-230 can be users 110a-110d, users 112a-112c, members 122a-122ncd, and/or members 136a-136n shown in FIG. 1.

The electronic network 220 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Computer systems and/or computing devices can communicate via electronic network 220 using various communication protocols (e.g., Internet communication protocols, WAN communication protocols, LAN communications protocols, P2P protocols, telephony protocols, and/or other network communication protocols), various authentication protocols, and/or various data types (web-based data types, audio data types, video data types, image data types, messaging data types, signaling data types, and/or other data types).

The computing devices 212-218 can be any type of computing device, including a smartphone, a handheld computer, a mobile device, a laptop, a tablet, a PC, or any other computing device.

Referring now to FIGS. 3-17, the computing devices 212-218 can display the graphical user interface screens 232-260 for the system 100 shown in FIG. 1. FIG. 3 depicts a screen 232 that displays a message 262 that includes an invitation to join a trust network, such as the primary trust network 114. The screen 234 can include a box 264 that includes instructions to keep the information that is being shared through the system 100 confidential.

Screens 234-236 depict a profile 266 for an eligible user, such as eligible user 110a shown in FIG. 1, before the profile 266 has been anonymized. The screen 234 includes a warning box 268 reminding the eligible user 110a that he or she should not include identifying information in the profile. Screens 238-240 depict an anonymized profile 270 for the eligible user 110a.

As shown in FIGS. 8-11, screens 242-248 depict interfaces for members of the trust networks, such as network members 122a-122ncd, and/or members 136a-136n shown in FIG. 1. The screens 242-248 provide the members 122a-122ncd, and/or members 136a-136n with the ability to share the anonymized profile 270, shown in FIGS. 6-7, with a potentially matching user, such as potentially matching user 112a shown in FIG. 1. Alternatively, the network members 122a-122ncd, and/or members 136a-136n can send the anonymized profile 270 to other members of their network(s) 114-118 and/or network 134.

Screens 242-248 indicate that the network members 122a-122ncd, and/or members 136a-136n can have the ability to send the profiles 120 and 126 shown in FIG. 1, through one or more of the trust networks 114-118 and/or network 134 shown in FIG. 1.

Figure 12:
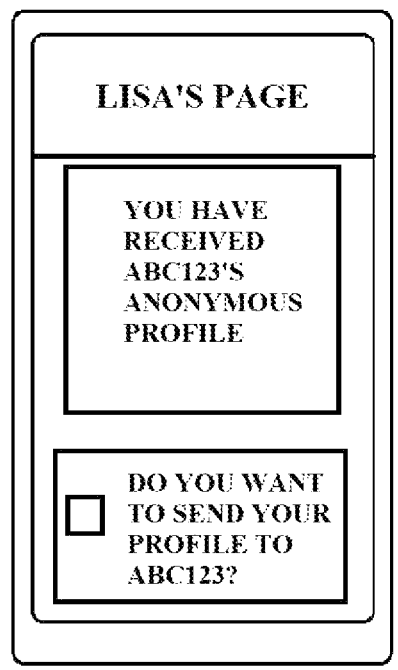
Figure 13:
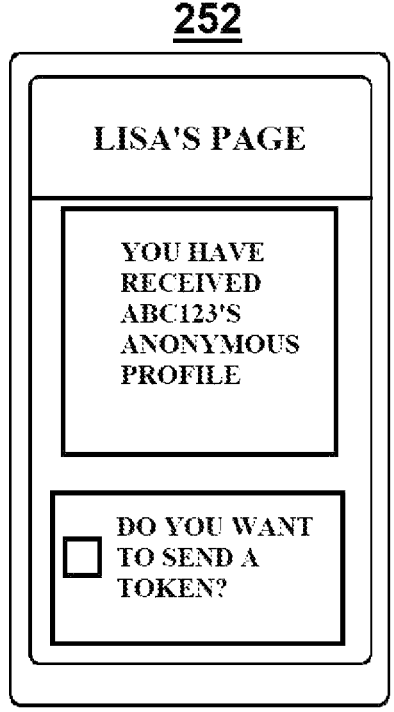
Figure 14:
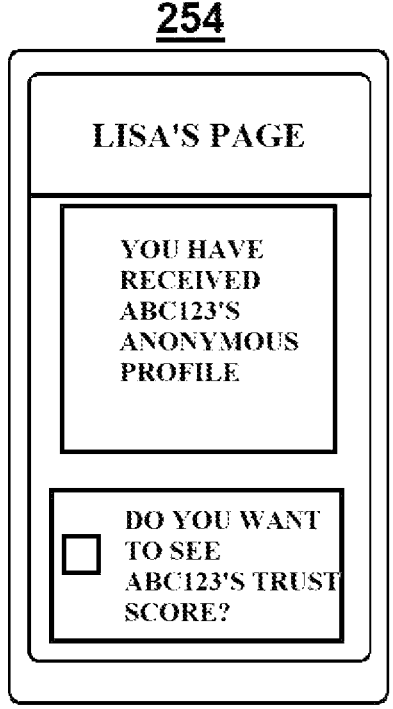

FIGS. 12-14 depict interface screens 250-256 that can be viewed by a potentially matching user, such as potentially matching user 112*a* shown in FIG. 1. The screen 252 provides the potentially matching user 112*a* with the ability to send her own anonymized profile through the trust networks 114-118 and/or network 134 shown in FIG. 1 to the eligible user 110*a*. In some embodiments, the interface screens 250-256 can be configured to indicate that the potentially matching user 112*a* is consenting to communicate with the eligible user 110*a* if reciprocated.

The screen 254 provides the matching user 112 with the ability to send a consent token through the trust network to indicate interest. The screen 254 provides the matching user with the ability to see a trust score for the eligible user 110*a* shown in FIG. 1.

Figure 15:
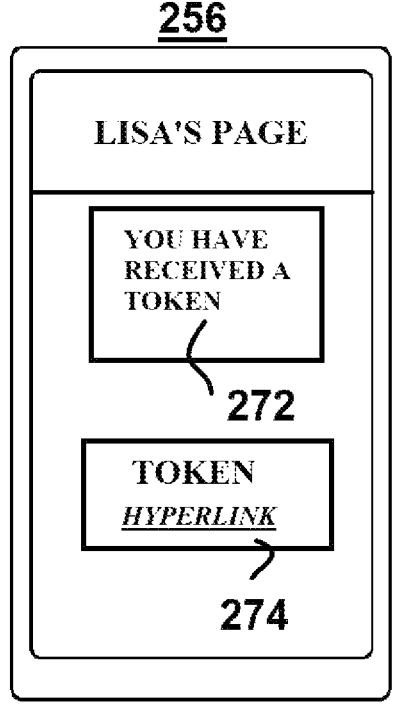

FIG. 15 depicts a screen 256 through which a potentially matching user 112*a* can receive a consent token. The screen 256 includes a message section 272 indicating the receipt of the consent token and a viewing section 274 that provides the ability to view the consent token. As stated above, the consent token can be a link to enable direct communication through the platform on the system 100, as illustrated in FIG. 1. The consent token can be consent token 124-128. In various embodiment, the consent token link 274 can direct to an external website, app, or platform that contains their separate communication channel. It is envisioned that the system 100 of FIG. 1 can be integrated into external websites, such that communication between the eligible user and potentially matching user are not limited to singular channels.

Figure 16:
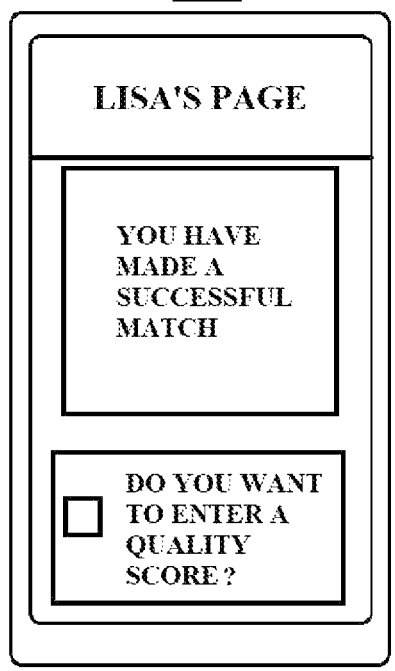
Figure 17:
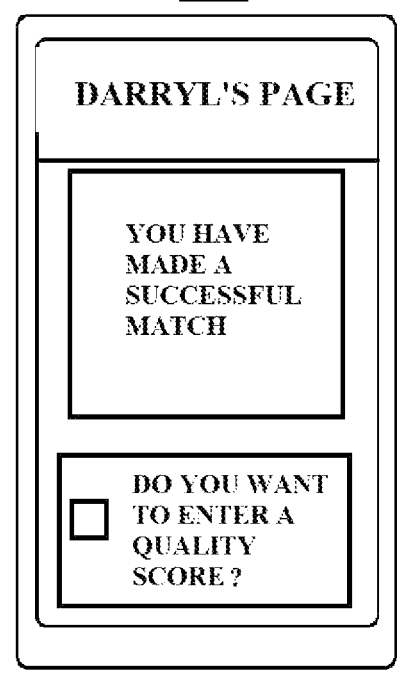

FIGS. 16-17 depict screens 258-260 through which the eligible user 110*a* shown in FIG. 1 and the potentially matching user 112*a* shown in FIG. 1 can enter quality score to rate the quality of the match. In some embodiments, the eligible user 110*a* and/or the potentially matching user 112*a* will have the ability to access and/or to view the quality scores. In other embodiments, the quality scores are maintained in confidence by the system 100 shown in FIG. 1 for quality control or other internal purposes.

Figure 18:
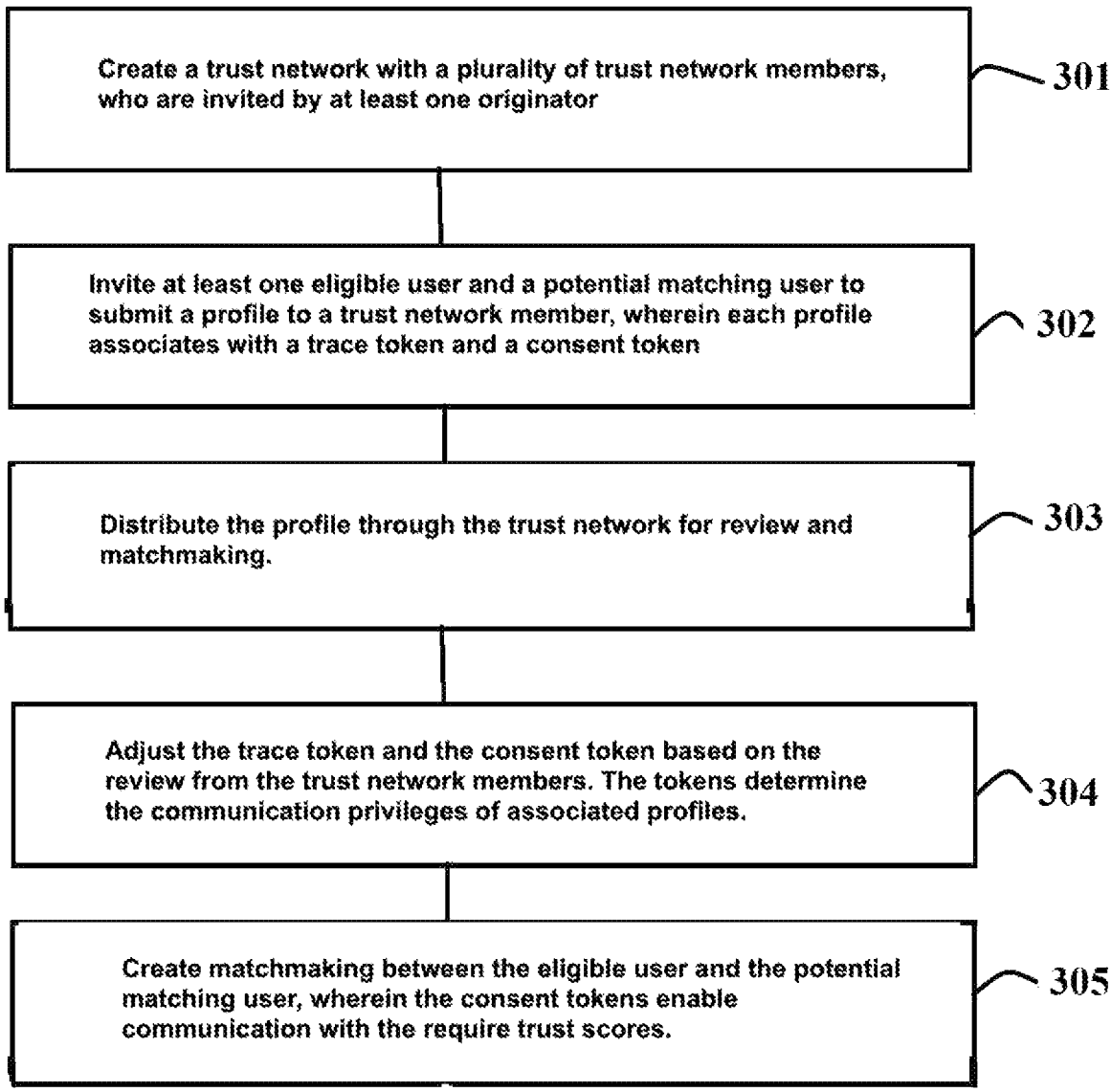
FIG. 18 illustrates an exemplary process in accordance with this disclosure.

Referring to FIG. 18 with continuing reference to the foregoing figures, an exemplary process, generally designated by the numeral 300, for matching an eligible user to potentially matching user is shown. The process 300 can be a performed within the system 100 shown in FIG. 1 and/or the operating environment 200 shown in FIG. 2.

At 301, a trust network is created with a plurality of trust network members. The trust network can be initiated by at least one originator. The originator invites a plurality of trust network members, who can further participate in the trust network functions as provided for by the originator and the trust network.

At 302, any of the trust network members, including the originator, can invite at least one eligible user and a potential matching user to submit a profile. Alternatively, the eligible user or potential matching user can contact a trust network member to begin using the trust network for their benefit. The profile can be generated by surveying the eligible user/potential matching user for information input. Alternatively, the profile can be generated by importing information from external websites that are integrated with the match making system.

Each of the profile is associated with a trace token and a consent token. The trace token is used to keep track of the profile as it is being shared through the matchmaking system and the associated trust network. The consent token enables communication between the eligible user and the potential matching user, if approved. In various other embodiments, the profile is a document that is shareable and reviewable by the trust network members.

At 303, the profile is distributed through the trust network for review and matchmaking. The profile is shared by the trust network members, who evaluate the profile based on the information provided by the eligible user or matching user. The profile is evaluated and given a trust score, which will be applied to the trace token and the consent token. The trace token also enables the profile to be distributed in the network without revealing the identity of the user, if anonymity is to be preserved. In various embodiments, the profile allows trust network members to evaluate documents imported from external websites, apps, programs, or platforms that integrate with the matchmaking system.

At 304, the trace token and the consent token are adjusted based on the review from the trust network members. The review can generate a trust score that is associated with the tokens, which can then be used to determine the communication privileges of the associated profiles. In various embodiments, the trust score provides a quantifiable way for the system to assign access to the profile from the trust network and the associated users. Should the trust score be lower than the standard for a trust network, the profile will not be matched with potential users. In turn, the eligible user associated with the profile will not be able to access the consent token in order to initiate communication with the matching user. In various alternative embodiments, the trust score dictates whether an associated user can access a document shared by a matching user for edits. There are a number of applications that can utilize the trust score set up with trace and consent tokens, such as file sharing, document edits, matchmaking, employment, etc.

At 305, matchmaking is created between the eligible user and the potential marching user. If the trust score is at the requisite level, the eligible user and the potential matching user can use the consent tokens to enable communication. Such communication can be carried out on a platform that integrates the matchmaking system natively or through an external platform. The matchmaking conducted through the trust network essentially serves as a peer-based review process for the profiles shared thereon. The communication channel can be enabled through links to external platforms, which can include text based communication, visual/audio communication, or interactivity through shared documents or digital mediums. The trusted network can be utilized as an additional layer of verification and peer review for external programs, in addition to built-in relationship building programs.

Exemplary Cloud Architecture

Figure 19:
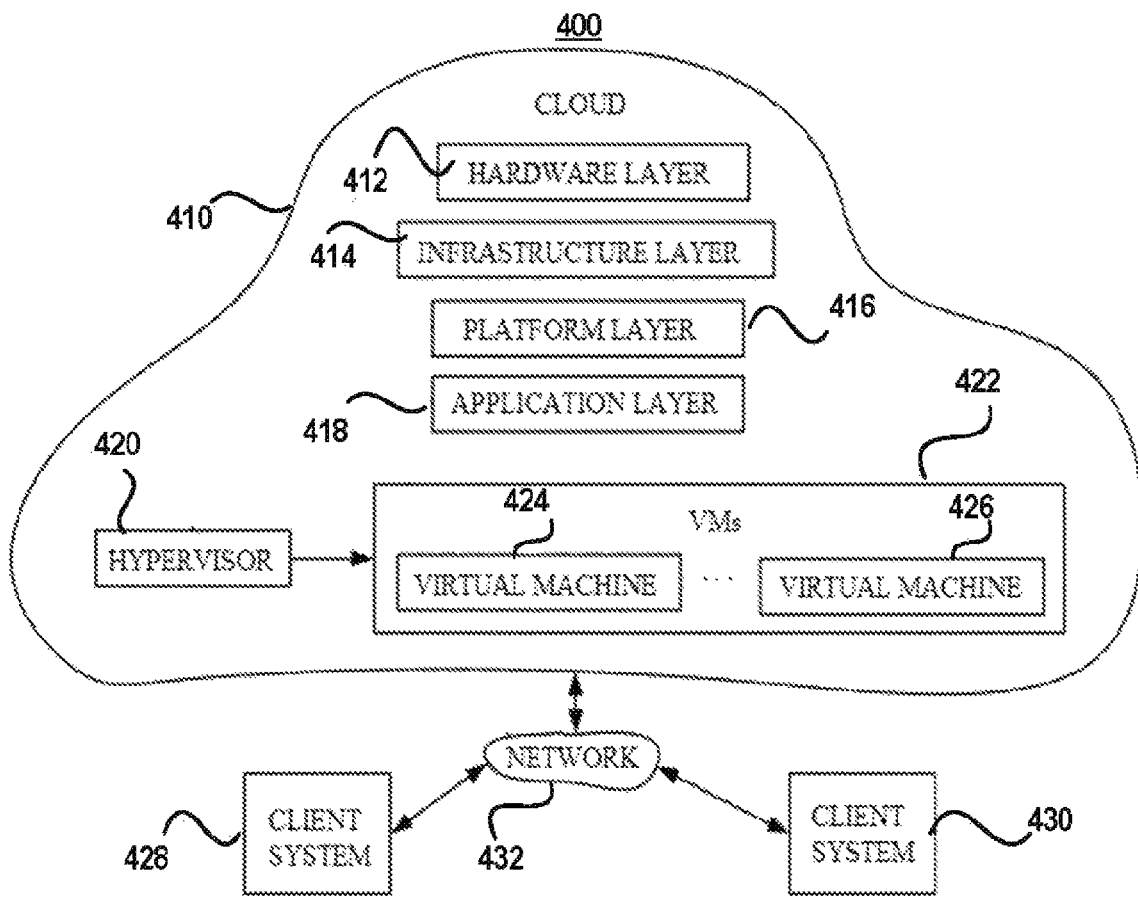
FIG. 19 illustrates a block diagram of a cloud-based computing system operable to execute the disclosed systems and methods in accordance with this disclosure.

Referring to FIG. 19 with continuing reference to the foregoing figures, exemplary cloud architecture, generally designated by the numeral 400, for implementing the system 100 shown in FIG. 1, the operating environment 200 shown in FIGS. 2-17, and/or performing the process 300 shown in FIG. 18.

The exemplary cloud architecture 400 provides computation, software, data access, and storage services that do not require end-user knowledge of the physical location or configuration of the system that delivers the services. In various embodiments, cloud computing delivers the services over a wide area network, such as the internet, using appropriate protocols.

For instance, cloud computing providers deliver applications over a wide area network and they can be accessed through a web browser or any other computing component. Software or components of architecture 400 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

As shown in FIG. 19, the cloud architecture 400 includes a cloud 410. The cloud 410 (or each of the different premises on the cloud 410) can include a hardware layer 412, an infrastructure layer 414, a platform layer 416, and an application layer 418.

A hypervisor 420 can illustratively manage or supervise a set of virtual machines 422 that can include a plurality of different, independent, virtual machines 424-426. Each virtual machine can illustratively be an isolated software container that has an operating system and an application inside it. It is illustratively decoupled from its host server by hypervisor 420. In addition, hypervisor 420 can spin up additional virtual machines or close virtual machines, based upon workload or other processing criteria.

A plurality of different client systems 428-430 (which can be end user systems or administrator systems, or both) can illustratively access cloud 410 over a network 432. Depending upon the type of service being used by each of the client systems 428-430, cloud 410 can provide different levels of service. In one example, the users of the client systems are provided access to application software and databases. The cloud service then manages the infrastructure and platforms that run the application. This can be referred to as software as a service (or SaaS). The software providers operate application software in application layer 418 and end users access the software through the different client systems 428-430.

The cloud provider can also use platform layer 416 to provide a platform as a service (PaaS). This involves an operating system, programming language execution environment, database and webserver being provided to the client systems 428-430, as a service, from the cloud provider. Application developers then normally develop and run software applications on that cloud platform and the cloud provider manages the underlying hardware and infrastructure and software layers. In this exemplary embodiment, the cloud provider is Google. The cloud infrastructure 400 is provided by the Google Cloud Platform.

The cloud provider can also use infrastructure layer 414 to provide infrastructure as a service (IaaS). In such a service, physical or virtual machines and other resources are provided by the cloud provider, as a service. These resources are provided, on-demand, by the IaaS cloud provider, from large pools installed in data centers. In order to deploy the applications, the cloud users that use IaaS install operating-system images and application software on the cloud infrastructure 400.

Exemplary Computer System

Figure 20:
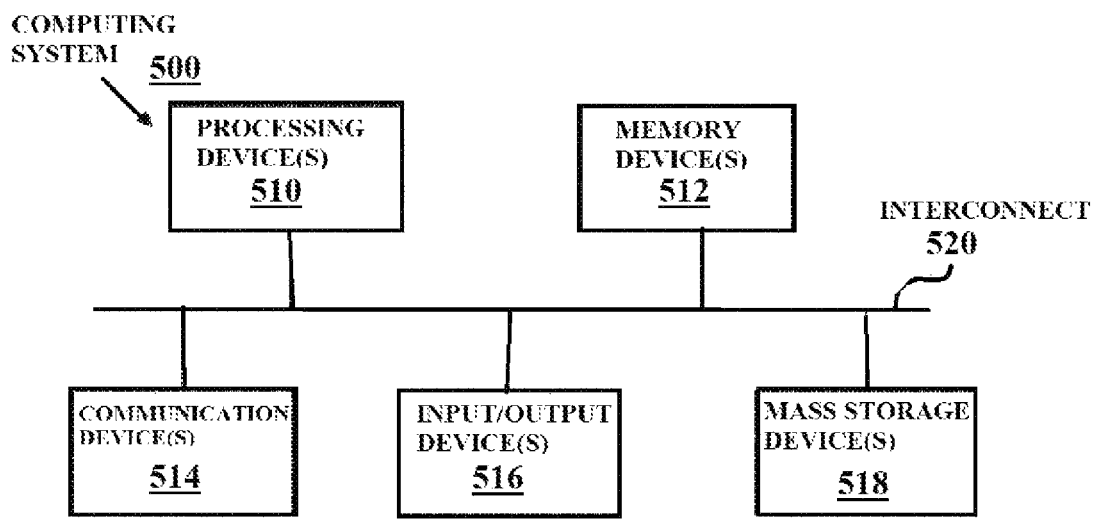
FIG. 20 illustrates a block diagram of a computing system operable to execute the disclosed systems and methods in accordance with this disclosure.

Referring now to FIG. 20 with continuing reference to the forgoing figures, a computer system for implementing an exemplary computing system, generally designated by the numeral 500, for use by the system 100 shown in FIG. 1 and/or the operating environment 200 shown in FIGS. 2-17.

The hardware architecture of the computing system 500 that can be used to implement any one or more of the functional components described herein. In some embodiments, one or multiple instances of the computing system 500 can be used to implement the techniques described herein, where multiple such instances can be coupled to each other via one or more networks.

The illustrated computing system 500 includes one or more processing devices 510, one or more memory devices 512, one or more communication devices 514, one or more input/output (I/O) devices 516, and one or more mass storage devices 518, all coupled to each other through an interconnect 520. The interconnect 520 can be or include one or more conductive traces, buses, point-to-point connections, controllers, adapters, and/or other conventional connection devices. Each of the processing devices 510 controls, at least in part, the overall operation of the processing of the computing system 500 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 512 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Each mass storage device 518 can be or include one or more hard drives, digital versatile disks (DVDs), flash memories, or the like. Each memory device 512 and/or mass storage device 518 can store (individually or collectively) data and instructions that configure the processing device(s) 510 to execute operations to implement the techniques described above.

Each communication device 514 can be or include, for example, an Ethernet adapter, cable modem, Wi-Fi adapter, cellular transceiver, baseband processor, Bluetooth or Bluetooth Low Energy (BLE) transceiver, serial communication device, or the like, or a combination thereof. Depending on the specific nature and purpose of the processing devices 510, each I/O device 516 can be or include a device such as a display (which can be a touch screen display), audio speaker, keyboard, mouse or other pointing device, microphone, camera, etc. Note, however, that such I/O devices 516 can be unnecessary if the processing device 510 is embodied solely as a server computer.

In the case of a client device, the communication devices (s) 514 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 514 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 512). A processor (e.g., processing device(s) 510) is "configured to execute a software program" when at least one value associated with the software program is stored in a register that is readable by the processor. In some embodiments, routines executed to implement the disclosed techniques can be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 510), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 512).

Supported Features and Embodiments

The detailed description provided above in connection with the appended drawings explicitly describes and supports various features of a matchmaking system. By way of illustration and not limitation, supported embodiments include a method for matching users through a peer network. The method comprises creating a trust network with a plurality of trust network members. One of the plurality of trust network members receives a first profile from a first user and a second profile from a second user. The method then associates the first profile with a first trace token and a first consent token and associates the second profile with a second trace token and a second consent token. The method comprises distributing the first profile and the second profile through the trust network, wherein the first profile is anonymized and tracked by the first trace token and the second profile is anonymized and tracked by the second trace token. The method further comprises conducting a review by the plurality of trust network members and assigning a first trust score to the first consent token and a second trust score to the second consent token. Thereafter the first profile is edited with the first trust score and transmitted to the second user and the second profile is edited with the second trust score and transmitted to the first user. The method then comprises determining whether the first consent token is accessible by the first trust score and whether the second consent token is accessible by the second trust score, and establishing access between the first profile and the second profile when the first consent token and the second consent token are activated.

Supported embodiments include the foregoing method, further comprising identifying the first user and the second user after the access between the first profile and second profile are established, whereby anonymity is removed from the first profile and the second profile.

Supported embodiments include the foregoing method, further comprising enabling message based communication between the first user and second user when access is established between the first profile and the second profile.

Supported embodiments include the foregoing method, wherein the first profile and the second profile are generated by importing user information from at least one external platform.

Supported embodiments include the foregoing method, wherein the access between the first profile and the second profile is implemented on the at least one external platform.

Supported embodiments include the foregoing method, wherein the first profile and the second profile are documents supplied by the first user and the second user, wherein the first trust score and the second trust score determine access to the documents.

Supported embodiments include the foregoing method, wherein the documents become editable by the first user and the second user when the first trust score and the second trust score reach a trust standard to enable activation of the first consent token and the second consent token, wherein access is generated between the first user and the second user in regard to the documents.

Supported embodiments include the foregoing method, wherein the documents are imported by the first user and the second user from at least one external platform, wherein the first trust score and the second trust score determine access to the documents, wherein the documents become editable by the first user and the second user when the first trust score and the second trust score reach a trust standard to enable activation of the first consent token and the second consent token, wherein access is generated between the first user and the second user through the at least one external platform in regard to the documents.

Supported embodiments include the foregoing method, wherein each trust network member is able to create, and organize at least one additional trust network, which comprises at least one additional trust network member, wherein the additional trust network is implemented to distribute and review the first profile and the second profile and provide a trust score, wherein each additional trust network can assign a trust score to determine access to first user and the second user.

Supported embodiments include a system for matching users through a peer network, comprising a memory having computer readable instructions; and a processor for executing the computer readable instructions, the computer readable instructions including instructions for creating a trust network with a plurality of trust network members. One of the plurality of trust network members receives a first profile from a first user and a second profile from a second user. The system then associates the first profile with a first trace token and a first consent token and associates the second profile with a second trace token and a second consent token. The system comprises distributing the first profile and the second profile through the trust network, wherein the first profile is anonymized and tracked by the first trace token and the second profile is anonymized and tracked by the second trace token. The system further comprises conducting a review by the plurality of trust network members and assigning a first trust score to the first consent token and a second trust score to the second consent token. Thereafter the first profile is edited with the first trust score and transmitted to the second user and the second profile is edited with the second trust score and transmitted to the first user. The system then comprises determining whether the first consent token is accessible by the first trust score and whether the second consent token is accessible by the second trust score, and establishing access between the first profile and the second profile when the first consent token and the second consent token are activated.

Supported embodiments include the foregoing system for matching users through a peer network, further comprising instructions for identifying the first user and the second user after the access between the first profile and second profile are established, whereby anonymity is removed from the first profile and the second profile.

Supported embodiments include any of the foregoing systems for matching users through a peer network, further comprising instructions for enabling message based communication between the first user and second user when access is established between the first profile and the second profile.

Supported embodiments include any of the foregoing systems for matching users through a peer network, wherein the first profile and the second profile are generated by importing user information from at least one external platform.

Supported embodiments include any of the foregoing systems for matching users through a peer network, wherein the access between the first profile and the second profile is implemented on the at least one external platform.

Supported embodiments include any of the foregoing systems for matching users through a peer network, wherein the first profile and the second profile are documents supplied by the first user and the second user, wherein the first trust score and the second trust score determine access to the documents.

Supported embodiments include any of the foregoing systems for matching users through a peer network, wherein the documents become editable by the first user and the second user when the first trust score and the second trust score reach a trust standard to enable activation of the first consent token and the second consent token, wherein access is generated between the first user and the second user in regard to the documents.

Supported embodiments include any of the foregoing systems for matching users through a peer network, wherein the documents are imported by the first user and the second user from at least one external platform, wherein the first trust score and the second trust score determine access to the documents, wherein the documents become editable by the first user and the second user when the first trust score and the second trust score reach a trust standard to enable activation of the first consent token and the second consent token, wherein access is generated between the first user and the second user through the at least one external platform in regard to the documents.

Supported embodiments include any of the foregoing systems for matching users through a peer network, wherein each trust network member is able to create, and organize at least one additional trust network, which comprises at least one additional trust network member, wherein the additional trust network is implemented to distribute and review the first profile and the second profile and provide a trust score, wherein each additional trust network can assign a trust score to determine access to first user and the second user.

Supported embodiments include a method for providing peer-based review through a trust network, comprising creating a trust network with a plurality of trust network members. The method comprises creating a first profile based on a first document from a first user, and associating the first profile with a first trace token and a first consent token. The method also comprises creating a second profile based on a second document from a second user and associating the second profile with a second trace token and a second consent token. The first profile and the second profile are distributed through the trust network, wherein the first profile is anonymized and tracked by the first trace token and the second profile is anonymized and tracked by the second trace token. Thereafter, a review is conducted by the plurality of trust network members and assigning a first trust score to the first consent token and a second trust score to the second consent token. The method further comprises transmitting the first profile edited with the first trust score to the second user and transmitting the second profile edited with the second trust score to the first user and determining whether the first consent token is accessible by the first trust score and whether the second consent token is accessible by the second trust score. Thereafter, an access is established between the first profile and the second profile when the first consent token and the second consent token are activated, and the method comprises enabling editing on the first document and the second document by the first user and the second user.

Supported embodiments include the foregoing method for providing peer-based review through a trust network, wherein the documents are imported by the first user and the second user from at least one external platform.

Supported embodiments include any of the foregoing methods, further comprising: transmitting, through the electronic network, to the potentially matching user a message identifying the eligible user after the consent token is exchanged.

Supported embodiments include any of the foregoing methods, further comprising: receiving, through the electronic network, a message identifying the potentially matching user after the consent token is exchanged.

Supported embodiments include any of the foregoing methods, wherein the anonymized eligible user profile includes a first encoded identifier to identify the eligible user and the potentially matching user profile includes a second encoded identifier to identify the potentially matching user.

Supported embodiments include any of the foregoing methods, wherein the consent token includes at least one of the first encoded identifier and the second encoded identifier.

Supported embodiments include any of the foregoing methods, wherein the consent token includes a hyperlink to a third-party social media profile for at least one of the eligible user and the potentially matching user.

Supported embodiments include any of the foregoing methods, wherein the consent token includes a hyperlink to a dating profile on a third-party dating website for at least one of the eligible user and the potentially matching user.

Supported embodiments include any of the foregoing methods, further comprising: connecting the anonymized eligible user to the potentially matching user over the electronic network for communication therebetween.

Supported embodiments include any of the foregoing methods, further comprising: connecting the anonymized eligible user to the potentially matching user over the electronic network for communication through at least one of email, chat, video chat, and audio.

Supported embodiments include any of the foregoing methods, wherein the anonymized eligible user profile is sent to a secondary trust network member through the primary trust network member.

Supported embodiments include any of the foregoing methods, the anonymized potentially matching user profile is received from a secondary trust network member through the primary trust network member.

Supported embodiments include any of the foregoing methods, wherein the anonymized eligible user profile is sent to a tertiary trust network member through the primary trust network member and a secondary trust network member.

Supported embodiments include any of the foregoing methods, wherein the potentially matching user profile is received from a tertiary trust network member through the primary trust network member and a secondary trust network member.

Supported embodiments include any of the foregoing methods, further comprising: calculating at least one of a trust score and a quality score.

Supported embodiments include a system comprising: a memory having computer readable instructions; and a processor for executing the computer readable instructions, the computer readable instructions including instructions for: sending, through an electronic network, an anonymized eligible user profile from an eligible user to a primary trust network member for transmission to the potentially matching user; receiving, through the electronic network, an anonymized potentially matching user profile from the potentially matching user through the primary trust network member; and exchanging, through the electronic network, a consent token when the eligible user and the potentially matching user agree to contact.

Supported embodiments include any of the foregoing systems, further comprising instructions for: transmitting, through the electronic network, to the potentially matching user a message identifying the eligible user after the consent token is exchanged.

Supported embodiments include any of the foregoing systems, further comprising instructions for: receiving, through the electronic network, a message identifying the potentially matching user after the consent token is exchanged.

Supported embodiments include any of the foregoing systems, wherein the anonymized eligible user profile includes a first encoded identifier to identify the eligible user and the potentially matching user profile includes a second encoded identifier to identify the potentially matching user.

Supported embodiments include any of the foregoing systems, wherein the consent token includes at least one of the first encoded identifier and the second encoded identifier.

Supported embodiments include any of the foregoing systems, wherein the consent token includes a hyperlink to a third-party social media profile for at least one of the eligible user and the potentially matching user.

Supported embodiments include any of the foregoing systems, wherein the consent token includes a hyperlink to a dating profile on a third-party dating website for at least one of the eligible user and the potentially matching user.

Supported embodiments include any of the foregoing systems, further comprising instructions for: connecting the anonymized eligible user to the potentially matching user over the electronic network for communication therebetween.

Supported embodiments include any of the foregoing systems, further comprising instructions for: connecting the anonymized eligible user to the potentially matching user over the electronic network for communication through at least one of email, chat, video chat, and audio.

Supported embodiments include any of the foregoing systems, wherein the anonymized eligible user profile is sent to a secondary trust network member through the primary trust network member.

Supported embodiments include any of the foregoing systems, wherein the anonymized potentially matching user profile is received from a secondary trust network member through the primary trust network member.

Supported embodiments include any of the foregoing systems, wherein the anonymized eligible user profile is sent to a tertiary trust network member through the primary trust network member and a secondary trust network member.

Supported embodiments include any of the foregoing systems, wherein the potentially matching user profile is received from a tertiary trust network member through the primary trust network member and a secondary trust network member.

Supported embodiments include any of the foregoing systems, calculating at least one of a trust score and a quality score.

Supported embodiments include a device, an apparatus, a computer-readable storage medium, a computer program product and/or means for implementing any of the foregoing systems, methods, or portions thereof.

The detailed description provided above in connection with the appended drawings is intended as a description of examples and is not intended to represent the only forms in which the present examples can be constructed or utilized. It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A method for matching users through a peer network, comprising:
creating a trust network with a plurality of trust network members,
receiving a first profile from a first user to one of the plurality of trust network members,
associating the first profile with a first trace token and a first consent token,
receiving a second profile from a second user to one of the plurality of trust network members,
associating the second profile with a second trace token and a second consent token,
distribute the first profile and the second profile through the trust network, wherein the first profile is anonymized and tracked by the first trace token and the second profile is anonymized and tracked by the second trace token,
conducting a review by the plurality of trust network members and assigning a first trust score to the first consent token and a second trust score to the second consent token,
transmitting the first profile edited with the first trust score to the second user and transmitting the second profile edited with the second trust score to the first user, determining whether the first consent token is accessible by the first trust score and whether the second consent token is accessible by the second trust score, and establishing access between the first profile and the second profile when the first consent token and the second consent token are activated.

2. The method of claim 1, further comprising:

identifying the first user and the second user after the access between the first profile and second profile are established, whereby anonymity is removed from the first profile and the second profile.

3. The method of claim 1, further comprising:

enabling message based communication between the first user and second user when access is established between the first profile and the second profile.

4. The method of claim 1, wherein the first profile and the second profile are generated by importing user information from at least one external platform.

5. The method of claim 4, wherein the access between the first profile and the second profile is implemented on the at least one external platform.

6. The method of claim 1, wherein the first profile and second profile are documents supplied by the first user and the second user, wherein the first trust score and the second trust score determine access to the documents.

7. The method of claim 6, wherein the documents become editable by the first user and the second user when the first trust score and the second trust score reach a trust standard to enable activation of the first consent token and the second consent token, wherein access is generated between the first user and the second user in regard to the documents.

8. The method of claim 6, wherein the documents are imported by the first user and the second user from at least one external platform, wherein the first trust score and the second trust score determine access to the documents, wherein the documents become editable by the first user and the second user when the first trust score and the second trust score reach a trust standard to enable activation of the first consent token and the second consent token, and wherein access is generated between the first user and the second user through the at least one external platform in regard to the documents.

9. The method of claim 1, wherein each trust network member is able to create, and organize at least one additional trust network, which comprises at least one additional trust network member, wherein the additional trust network is implemented to distribute and review the first profile and the second profile and provide a trust score, and wherein each additional trust network can assign a trust score to determine access to first user and the second user.

10. A system for matching users through a peer network, comprising:

a memory having computer readable instructions; and a processor for executing the computer readable instructions, the computer readable instructions including instructions for:

creating a trust network with a plurality of trust network members, receiving a first profile from a first user to one of the plurality of trust network members, associating the first profile with a first trace token and a first consent token, receiving a second profile from a second user to one of the plurality of trust network members, associating the second profile with a second trace token and a second consent token, distribute the first profile and the second profile through the trust network, wherein the first profile is anonymized and tracked by the first trace token and the second profile is anonymized and tracked by the second trace token, conducting a review by the plurality of trust network members and assigning a first trust score to the first consent token and a second trust score to the second consent token, transmitting the first profile edited with the first trust score to the second user and transmitting the second profile edited with the second trust score to the first user, determining whether the first consent token is accessible by the first trust score and whether the second consent token is accessible by the second trust score, and establishing access between the first profile and the second profile when the first consent token and the second consent token are activated.

11. The system of claim 10, further comprising instructions for:

identifying the first user and the second user after the access between the first profile and second profile are established, whereby anonymity is removed from the first profile and the second profile.

12. The system of claim 10, further comprising instructions for:

enabling message based communication between the first user and second user when access is established between the first profile and the second profile.

13. The system of claim 10, the first profile and the second profile are generated by importing user information from at least one external platform.

14. The system of claim 13, wherein the access between the first profile and the second profile is implemented on the at least one external platform.

15. The system of claim 10, wherein the first profile and the second profile are documents supplied by the first user and the second user, wherein the first trust score and the second trust score determine access to the documents.

16. The system of claim 15, wherein the documents become editable by the first user and the second user when the first trust score and the second trust score reach a trust standard to enable activation of the first consent token and the second consent token, and wherein access is generated between the first user and the second user in regard to the documents.

17. The system of claim 15, wherein the documents are imported by the first user and the second user from at least one external platform, wherein the first trust score and the second trust score determine access to the documents, wherein the documents become editable by the first user and the second user when the first trust score and the second trust score reach a trust standard to enable activation of the first consent token and the second consent token, and wherein access is generated between the first user and the second user through the at least one external platform in regard to the documents.

18. The system of claim 10, wherein each trust network member is able to create, and organize at least one additional trust network, which comprises at least one additional trust network member, wherein the additional trust network is implemented to distribute and review the first profile and the second profile and provide a trust score, wherein each additional trust network can assign a trust score to determine access to first user and the second user.

19. A method for providing peer-based review through a trust network, comprising:

creating a trust network with a plurality of trust network members, creating a first profile based on a first document from a first user, associating the first profile with a first trace token and a first consent token, creating a second profile based on a second document from a second user, associating the second profile with a second trace token and a second consent token, distribute the first profile and the second profile through the trust network, wherein the first profile is anonymized and tracked by the first trace token and the second profile is anonymized and tracked by the second trace token, conducting a review by the plurality of trust network members and assigning a first trust score to the first consent token and a second trust score to the second consent token, transmitting the first profile edited with the first trust score to the second user and transmitting the second profile edited with the second trust score to the first user, determining whether the first consent token is accessible by the first trust score and whether the second consent token is accessible by the second trust score, establishing access between the first profile and the second profile when the first consent token and the second consent token are activated, and enabling editing on the first document and the second document by the first user and the second user.

20. The method of claim 19, wherein the documents are imported by the first user and the second user from at least one external platform.

* * * * *